United States Patent
Pellegatti et al.

(10) Patent No.: US 8,344,086 B2
(45) Date of Patent: Jan. 1, 2013

(54) 1-BUTENE TERPOLYMERS

(75) Inventors: Giampaolo Pellegatti, Ferrara (IT);
Stefano Spataro, Ferrara (IT); Tiziana Caputo, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 298 days.

(21) Appl. No.: 12/988,524

(22) PCT Filed: Mar. 18, 2009

(86) PCT No.: PCT/EP2009/053180
§ 371 (c)(1),
(2), (4) Date: Oct. 19, 2010

(87) PCT Pub. No.: WO2009/130092
PCT Pub. Date: Oct. 29, 2009

(65) Prior Publication Data
US 2011/0034658 A1 Feb. 10, 2011

Related U.S. Application Data

(60) Provisional application No. 61/125,314, filed on Apr. 24, 2008.

(30) Foreign Application Priority Data

Apr. 22, 2008 (EP) .................................... 08154911

(51) Int. Cl.
*C08F 210/08* (2006.01)
*C08F 10/08* (2006.01)
*C08F 210/04* (2006.01)
(52) U.S. Cl. ........................ 526/348.6; 526/348; 528/396
(58) Field of Classification Search ............... 526/348.6, 526/348
See application file for complete search history.

(56) References Cited

U.S. PATENT DOCUMENTS

| | | | |
|---|---|---|---|
| 5,698,487 A | 12/1997 | Sacchetti et al. | |
| 5,869,723 A | 2/1999 | Hinokuma et al. | |
| 6,559,252 B1 | 5/2003 | Horton et al. | |
| 6,773,808 B2 * | 8/2004 | Ogawa et al. | 428/349 |
| 6,949,614 B1 | 9/2005 | Schottek et al. | |
| 7,141,527 B1 | 11/2006 | Van Baar et al. | |
| 7,776,986 B2 * | 8/2010 | Bacci et al. | 526/348.6 |
| 2002/0038036 A1 | 3/2002 | Resconi et al. | |
| 2003/0013913 A1 | 1/2003 | Schottek et al. | |
| 2003/0134993 A1 | 7/2003 | Albizzati et al. | |
| 2006/0155071 A1 | 7/2006 | Morini et al. | |
| 2006/0235173 A1 | 10/2006 | Resconi | |
| 2009/0326156 A1 * | 12/2009 | Pellegatti et al. | 525/240 |
| 2010/0119752 A1 * | 5/2010 | Pellegatti et al. | 428/36.9 |
| 2010/0137543 A1 | 6/2010 | Pellegatti et al. | |
| 2011/0003939 A1 * | 1/2011 | Spataro et al. | 525/240 |

FOREIGN PATENT DOCUMENTS

WO WO 91/02012 2/1991
WO WO 92/00333 1/1992

OTHER PUBLICATIONS

Randall, J,C., "A Review of High Resolution Liquid [13]Carbon Nuclear Magnetic Resonance Characterizations of Ethylene-Based Polymers," *Rev. Macromol. Chem. Phys., C29(2 & 3)*, 201-313 1989.
Kakugo et al., $^{13}$C NMR Determination of Monomer Sequence Distribution in Ethylene-Propylene Copolymers Prepared with $\delta$-TiCl$_3$-Al(C$_2$H$_5$)$_2$Cl, *Macromolecules*, 15, 1150-1152 (1982).
Cheng, H.N., "$^{13}$C NMR analysis of propylene-butylene copolymers by a reaction probability model," *Journal of Polymer Science: Polymer Physics Edition*, 21, 573-581 (1983).
Carman et al., "Monomer Sequence Distribution in Ethylene-Propylene Rubber Measured by $^{13}$C NMR. 3. Use of Reaction Probability Model," *Macromolecules*, 10, 536 (1977).
Resconi et al., "New Catalysts Design for the Simultaneous Control Over Polypropylene Molecular Mass and Stereoregularity," *Polymeric Materials: Science & Engineering*, 87, 76-77 (2002).

* cited by examiner

*Primary Examiner* — Rip A. Lee
(74) *Attorney, Agent, or Firm* — Dilworth IP LLC

(57) ABSTRACT

1-butene/ethylene/propylene terpolymer containing:
c) from 4 to 10 wt % of ethylene derived units, and
d) from 2 to 10 wt % of propylene derived units;
the said terpolymer having the following properties:
distribution of molecular weights (Mw/Mn) measured by GPC lower than 3;
no melting point detectable at the DSC;
melting enthalpy, measured after 10 days of aging at room temperature, from 12 to 20 J/g.

6 Claims, No Drawings

1-BUTENE TERPOLYMERS

This application is the U.S. national phase of International Application PCT/EP2009/053180, filed Mar. 18, 2009, claiming priority to European Application 08154911.5 filed Apr. 22, 2008 and the benefit under 35 U.S.C. 119(e) of U.S. Provisional Application No. 61/125,314, filed Apr. 24, 2008; the disclosures of International Application PCT/EP2009/053180, European Application 08154911.5 and U.S. Provisional Application No. 61/125,314, each as filed, are incorporated herein by reference.

The present invention relates to 1-butene/ethylene/propylene terpolymers containing up to 18% by mole of units derived from ethylene, having an optimum balance of features. The said terpolymers are obtained by using a particular class of metallocene-based catalyst system. Butene-1 copolymers are well known in the art and have a wide range of applicability. In particular, butene-1 copolymers with a low content of comonomer (1-3% by mol) are generally characterized by good properties in terms of pressure resistance, creep resistance, impact strength and can be used in the manufacture of pipes for replacing the metal pipes. One of the key aspects for their application in the pipe sector is the excellent balance between flexibility and rigidity that they must have in order to combine easy pipe workability and mechanical resistance. Butene-1 copolymers with a higher content of comonomer can be used for example as components of blends with other polyolefin or polymeric products, in order to modulate particular properties such as sealing strength, flexibility and softness of the plastic materials.

WO 04/048424 relates to 1-butene copolymers containing up to 40% by mol of ethylene or propylene derived units. These copolymers are obtained by using titanium based catalyst, therefore they are endowed with a broad molecular weight distribution typical of this class of catalyst system. These copolymers have a Mw/Mn ratio measured via GPC higher than 3 and values of tension set higher than 30.

WO 04/099269 relates to 1-butene/ethylene polymers from metallocene catalyst wherein the content of ethylene derived component units ranges from 0.2 to 15% by mol. The applicant found that including also a certain amount of propylene derived units in the polymer chain it is possible to achieve a copolymer having an optimum balance of hardness and elasticity.

Thus, it is an object of the present invention a 1-butene/ethylene/propylene terpolymer containing:
 a) from 3 to 10 wt % (7.5% by mol to 18% by mol), preferably from 4 to 8 wt % (7.5% by mol to 15% by mol), of ethylene derived units in the polymer chain, and
 b) from 2 to 10 wt % (2.51% by mo to 12% by mol), preferably from 4 to 7 wt % (5% by mol to 8.5% by mol) of propylene derived units in the polymer chain;
the said terpolymer having the following properties:
 distribution of molecular weight (Mw/Mn) measured by GPC lower than 3;
 no melting point detectable at the DSC, measured according to the methods described in this document;
 Melting enthalpy, measured after 10 days of aging at room temperature measured according to the methods described in this document, of from 12 and 20 J/g; preferably from 14 to 18 J/g.

The 1-butene terpolymer object of the present invention presents a good balance between hardness and elastic behavior better described in term of tension set, other than it shows good values of clarity.

When the content of ethylene derived units is higher than 10 wt % the tensile properties of the terpolymer of the invention deteriorate. The ratio C2/C3 of the weight amount of ethylene on the weight amount of propylene is preferably from 0.2 to 2, more preferably from 0.3 to 1.5, even more preferably from 0.8 to 1.3.

The 1-butene/ethylene/propylene terpolymer according to the present invention does not show a melting point after it has been melted according to the common DSC procedure, however it is crystallizable, i.e. after 10 days that it has been melted the copolymer shows a melting point and a melting enthalpy.

Furthermore, the 1-butene/ethylene/propylene terpolymer of the present invention exhibits X-ray crystallinity, measured according to the method specified below, higher than 10%.

Preferably the 1-butene/ethylene/propylene terpolymer of the invention exhibit
 hardness shore A values (measured according to ISO 868) lower than 90; preferably lower than 85, and
 tension set values lower than 30% at 100% of deformation (ISO 2285) preferably lower than 20.
 tensile stress at break measured according to ISO 527 comprised between 3 MPa and 20 MPa, preferably between 7 and 15 MPa.
 elongation at break measured according to ISO 527 ranging from 550% to 800%; preferably from 600% to 750%.

The 1-butene/ethylene/propylene terpolymer of the present invention is also endowed with intrinsic viscosity (IV) higher than 1 dl/g; preferably from 1.5 to 2 dl/g. The intrinsic viscosity (IV) is in any case not higher than 3. Higher IV makes the processability of the compound very difficult. High intrinsic viscosity is generally associated to high molecular weight of the polymers.

Due to these well balanced features the 1-butene/ethylene/propylene terpolymer of the present invention can be used as modifier in compositions wherein there is the need to improve the elasticity. In particular the 1-butene/ethylene/propylene terpolymer of the present invention can be used in compositions suitable for making films, fibers, sheets, or compositions for injection molding and blow molding. Furthermore, the 1-butene/ethylene/propylene terpolymer of the present invention can be used as viscosity modifier, impact modifier elastic modifier and in general application wherein elasticity and clarity are requested.

A further advantage of the terpolymer of the present invention is that it is endowed with improved elasticity but exhibit also reduced stickiness; so that pelletizing or more generally handling the terpolymer according to the invention is easier.

The 1-butene/ethylene/propylene terpolymer of the present invention can be obtained by contacting under polymerization conditions 1-butene and ethylene and propylene in the presence of a particular class of metallocene-based catalyst system. The catalyst system is obtainable by contacting:
 (A) a stereorigid metallocene compound;
 (A) an alumoxane or a compound capable of forming an alkyl metallocene cation; and optionally
 (B) an organo aluminum compound.

Preferably the stereorigid metallocene compound belongs to the following formula (I):

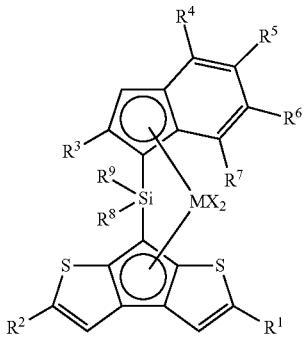

(I)

wherein:
M is an atom of a transition metal selected from those belonging to group 4; preferably M is zirconium;
X, equal to or different from each other, is a hydrogen atom, a halogen atom, a R, OR, OR'O, $OSO_2CF_3$, OCOR, SR, $NR_2$ or $PR_2$ group wherein R is a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radical, optionally containing heteroatoms belonging to groups 13-17 of the Periodic Table of the Elements; and R' is a $C_1$-$C_{20}$-alkylidene, $C_6$-$C_{20}$-arylidene, $C_7$-$C_{20}$-alkylarylidene, or $C_7$-$C_{20}$-arylalkylidene radical; preferably X is a hydrogen atom, a halogen atom, a OR'O or R group; more preferably X is chlorine or a methyl radical;
$R^1$, $R^2$, $R^5$, $R^6$, $R^7$, $R^8$ and $R^9$, equal to or different from each other, are hydrogen atoms, or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing heteroatoms belonging to groups 13-17 of the Periodic Table of the Elements; or $R^5$ and $R^6$, and/or $R^8$ and $R^9$ can optionally form a saturated or unsaturated, 5 or 6 membered rings, said ring can bear $C_1$-$C_{20}$ alkyl radicals as substituents; with the proviso that at least one of $R^6$ or $R^7$ is a linear or branched, saturated or unsaturated $C_1$-$C_{20}$-alkyl radical, optionally containing heteroatoms belonging to groups 13-17 of the Periodic Table of the Elements; preferably a $C_1$-$C_{10}$-alkyl radical;
preferably $R^1$, $R^2$, are the same and are $C_1$-$C_{10}$ alkyl radicals optionally containing one or more silicon atoms; more preferably $R^1$ and $R^2$ are methyl radicals;
$R^8$ and $R^9$, equal to or different from each other, are preferably $C_1$-$C_{10}$ alkyl or $C_6$-$C_{20}$ aryl radicals; more preferably they are methyl radicals;
$R^5$ is preferably a hydrogen atom or a methyl radical; or can be joined with $R^6$ to form a saturated or unsaturated, 5 or 6 membered rings, said ring can bear $C_1$-$C_{20}$ alkyl radicals as substituents;
$R^6$ is preferably a hydrogen atom or a methyl, ethyl or isopropyl radical; or it can be joined with $R^5$ to form a saturated or unsaturated, 5 or 6 membered rings as described above;
$R^7$ is preferably a linear or branched, saturated or unsaturated $C_1$-$C_{20}$-alkyl radical, optionally containing heteroatoms belonging to groups 13-17 of the Periodic Table of the Elements; preferably a $C_1$-$C_{10}$-alkyl radical; more preferably $R^7$ is a methyl or ethyl radical; otherwise when $R^6$ is different from a hydrogen atom, $R^7$ is preferably a hydrogen atom
$R^3$ and $R^4$, equal to or different from each other, are linear or branched, saturated or unsaturated $C_1$-$C_{20}$-alkyl radicals, optionally containing heteroatoms belonging to groups 13-17 of the Periodic Table of the Elements; preferably $R^3$ and $R^4$ equal to or different from each other are $C_1$-$C_{10}$-alkyl radicals; more preferably $R^3$ is a methyl, or ethyl radical; and $R^4$ is a methyl, ethyl or isopropyl radical;
(C) an alumoxane or a compound capable of forming an alkyl metallocene cation; and optionally
(D) an organo aluminum compound.
Preferably the compounds of formula (I) have formula (Ia) or (Ib):

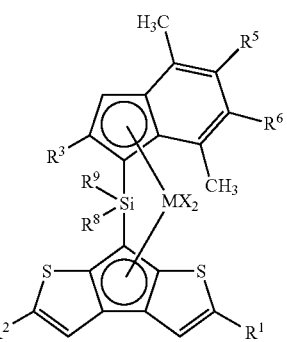

(Ia)

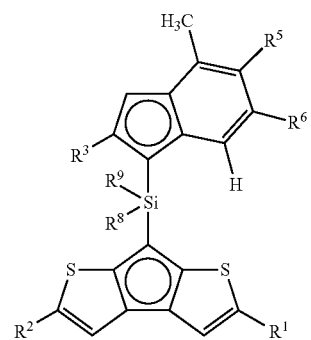

(Ib)

Wherein
M, X, $R^1$, $R^2$, $R^5$, $R^6$, $R^8$ and $R^9$ have been described above;
$R^3$ is a linear or branched, saturated or unsaturated $C_1$-$C_{20}$-alkyl radical, optionally containing heteroatoms belonging to groups 13-17 of the Periodic Table of the Elements; preferably $R^3$ is a $C_1$-$C_{10}$-alkyl radical; more preferably $R^3$ is a methyl, or ethyl radical.

Alumoxanes used as component B) can be obtained by reacting water with an organo-aluminium compound of formula $H_jAlU_{3-j}$ or $H_jAl_2U_{6-j}$, where U substituents, same or different, are hydrogen atoms, halogen atoms, $C_1$-$C_{20}$-alkyl, $C_3$-$C_{20}$-cyclalkyl, $C_7$-$C_{20}$-alkylaryl or C7-C20-arylalkyl radical, optionally containing silicon or germanium atoms with the proviso that at least one U is different from halogen, and j ranges from 0 to 1, being also a non-integer number. In this reaction the molar ratio of Al/water is preferably comprised between 1:1 and 100:1. The molar ratio between aluminium and the metal of the metallocene generally is comprised between about 10:1 and about 20000:1, and more preferably between about 100:1 and about 5000:1. The alumoxanes used in the catalyst according to the invention are considered to be linear, branched or cyclic compounds containing at least one group of the type:

wherein the substituents U, same or different, are described above.

In particular, alumoxanes of the formula:

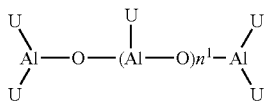

can be used in the case of linear compounds, wherein $n^1$ is 0 or an integer from 1 to 40 and the substituents U are defined as above, or alumoxanes of the formula:

can be used in the case of cyclic compounds, wherein $n^2$ is an integer from 2 to 40 and the U substituents are defined as above. Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO). Particularly interesting cocatalysts are those described in WO 99/21899 and in WO01/21674 in which the alkyl and aryl groups have specific branched patterns. Non-limiting examples of aluminium compounds according to WO 99/21899 and WO01/21674 are:
tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBAL), tris(2,4,4-trimethyl-pentyl)aluminium (TIOA), tris(2,3-dimethylbutyl)aluminium (TDMBA) and tris(2,3,3-trimethylbutyl)aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be able to be removed by an olefinic monomer. Preferably, the anion $E^-$ comprises of one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred examples of these compounds are described in WO 91/02012. Moreover, compounds of the formula $BAr_3$ can conveniently be used. Compounds of this type are described, for example, in the published International patent application WO 92/00333. Other examples of compounds able to form an alkylmetallocene cation are compounds of formula $BAr_3P$ wherein P is a substituted or unsubstituted pyrrol radicals. These compounds are described in WO01/62764. Other examples of cocatalyst can be found in EP 775707 and DE 19917985. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Trimethylammoniumtetra(tolyl)borate,
Tributylammoniumtetra(tolyl)borate,
Tributylammoniumtetra(pentafluorophenyl)borate,
Tripropylammoniumtetra(dimethylphenyl)borate,
Ttibutylammoniumtetra(trifluoromethylphenyl)borate,
Tributylammoniurntetra(4-fluorophenyl)borate,
N,N-Dimethylaniliniumtetra(phenyl)borate,
N,N-Dimethylaniliniumtetrakis(pentafluorophenyl)boratee.
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(phenyl)aluminate,
Ferroceniumtetrakis(pentafluorophenyl)borate,
N,N-Dimethylaniliniumtetrakis(pentafluorophenyl)borate.

Organic aluminum compounds used as compound C) are those of formula $H_jAlU_{3-j}$ or $H_jAl_2U_{6-j}$ described above. The catalysts of the present invention can also be supported on an inert carrier. This is achieved by depositing the metallocene compound A) or the product of the reaction thereof with the component B), or the component B) and then the metallocene compound A) on an inert support such as, for example, silica, alumina, Al—Si, Al—Mg mixed oxides, magnesium halides, styrene/divinylbenzene copolymers, polyethylene or polypropylene. The supportation process is carried out in an inert solvent such as hydrocarbon for example toluene, hexane, pentane or propane and at a temperature ranging from 0°

C. to 100° C., preferably the process is carried out at a temperature ranging from 25° C. to 90° C. or the process is carried out at room temperature.

A suitable class of supports which can be used is that constituted by porous organic supports functionalized with groups having active hydrogen atoms. Particularly suitable are those in which the organic support is a partially crosslinked styrene polymer. Supports of this type are described in European application EP-633272. Another class of inert supports particularly suitable for use according to the invention is that of polyolefin porous prepolymers, particularly polyethylene.

A further suitable class of inert supports for use according to the invention is that of porous magnesium halides such as those described in International application WO 95/32995.

The process for the polymerization of 1-butene, propylene and ethylene according to the invention can be carried out in the liquid phase in the presence or absence of an inert hydrocarbon solvent, such as in slurry, or in the gas phase. The hydrocarbon solvent can either be aromatic such as toluene, or aliphatic such as propane, hexane, heptane, isobutane or cyclohexane. Preferably the copolymers of the present invention are obtained by a solution process, i.e. a process carried out in liquid phase wherein the polymer is completely or partially soluble in the reaction medium. The polymerization carried out in the liquid 1-butene as a reaction medium is preferred.

As a general rule, the polymerization temperature is generally comprised between −100° C. and +200° C. preferably comprised between 40° and 90° C., more preferably between 50° C. and 80° C.

The polymerization pressure is generally comprised between 0.5 and 100 bar.

The lower the polymerization temperature, the higher are the resulting molecular weights of the polymers obtained.

The following examples are for illustrative purpose and do not intend to limit the scope of the invention.

EXAMPLES

The intrinsic viscosity (I.V.) was measured in tetrahydronaphtalene (THN) at 135° C.

The melting points of the polymers ($T_mII$) were measured by Differential Scanning Calorimetry (D.S.C.) on an Perkin Elmer DSC-7 instrument, according to the following method.

A weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites. Successively, after cooling to −20° C. with a scanning speed corresponding to 10° C./minute, the peak temperature was taken as crystallization temperature ($T_c$). After standing 5 minutes at −20° C., the sample was heated for the second time at 200° C. with a scanning speed corresponding to 10° C./min. In this second heating run, the peak temperature was taken as the melting temperature ($T_mII$) and the area as global melting enthalpy ($\Delta H_fII$).

The melting enthalpy after 10 days was measured as follows by using the Differential Scanning Calorimetry (D.S.C.) on an Perkin Elmer DSC-7 instrument.

A weighted sample (5-10 mg) obtained from the polymerization was sealed into aluminum pans and heated at 200° C. with a scanning speed corresponding to 20° C./minute. The sample was kept at 200° C. for 5 minutes to allow a complete melting of all the crystallites. The sample was then stored for 10 days at room temperature. After 10 days the sample was subjected to DSC, it was cooled to −20° C., and then it was heated at 200° C. with a scanning speed corresponding to 10° C./min. In this heating run, the peak temperature was taken as the melting temperature ($T_m$) and the area as global melting enthalpy after 10 days ($\Delta H_f$).

The amount of comonomer was calculated from $^{13}$C-NMR spectra of the copolymers of the examples. Measurements were performed on a polymer solution (8-12% by weight) in dideuterated 1,1,2,2-tetrachloro-ethane at 120° C. The $^{13}$C NMR spectra were acquired on a Bruker AV-600 spectrometer operating at 150.91 MHz in the Fourier transform mode at 120° C. using a 90° pulse, 15 seconds of delay between pulses and CPD (WALTZ16) to remove $^1$H-$^{13}$C coupling. About 1500 transients were stored in 32K data points using a spectral window of 60 ppm (0-60 ppm).

Copolymer Composition

Diad distribution is calculated from $^{13}$C NMR spectra using the following relations:

$$PP = 100 I_1/\Sigma$$

$$PB = 100 I_2/\Sigma$$

$$BB = 100(I_3 - I_{19})/\Sigma$$

$$PE = 100(I_5 + I_6)/\Sigma$$

$$BE = 100(I_9 + I_{10})/\Sigma$$

$$EE = 100(0.5(I_{15} + I_6 + I_{10}) + 0.25(I_{14}))/\Sigma$$

Where $\Sigma = I_1 + I_2 + I_3 - I_{19} + I_5 + I_6 + I_9 + I_{10} + 0.5(I_{15} + I_6 + I_{10}) + 0.25(I_{14})$ The molar content is obtained from diads using the following relations:

$$P(m\%) = PP + 0.5(PE + PB)$$

$$B(m\%) = BB + 0.5(BE + PB)$$

$$E(m\%) = EE + 0.5(PE + BE)$$

$I_1, I_2, I_3, I_5, I_6, I_9, I_{10}, I_{14}, I_{15}, I_{19}$ are integrals of the peaks in the $^{13}$C NMR spectrum (peak of EEE sequence at 29.9 ppm as reference). The assignments of these peaks are made according to J. C. Randal, *Macromol. Chem Phys.*, C29, 201 (1989), M. Kakugo, Y. Naito, K. Mizunuma and T. Miyatake, *Macromolecules*, 15, 1150, (1982), and H. N. Cheng, *Journal of Polymer Science, Polymer Physics Edition*, 21, 57 (1983). They are collected in Table A (nomenclature according to C. J. Carman, R. A. Harrington and C. E. Wilkes, *Macromolecules*, 10, 536 (1977)).

TABLE A

| I | Chemical Shift (ppm) | Carbon | Sequence |
|---|---|---|---|
| 1 | 47.34-45.60 | $S_{\alpha\alpha}$ | PP |
| 2 | 44.07-42.15 | $S_{\alpha\alpha}$ | PB |
| 3 | 40.10-39.12 | $S_{\alpha\alpha}$ | BB |
| 4 | 39.59 | $T_{\delta\delta}$ | EBE |
| 5 | 38.66-37.66 | $S_{\alpha\gamma}$ | PEP |
| 6 | 37.66-37.32 | $S_{\alpha\delta}$ | PEE |
| 7 | 37.24 | $T_{\beta\delta}$ | BBE |
| 8 | 35.22-34.85 | $T_{\beta\beta}$ | XBX |
| 9 | 34.85-34.49 | $S_{\alpha\gamma}$ | BBE |
| 10 | 34.49-34.00 | $S_{\alpha\delta}$ | BEE |
| 11 | 33.17 | $T_{\delta\delta}$ | EPE |
| 12 | 30.91-30.82 | $T_{\beta\delta}$ | XPE |
| 13 | 30.78-30.62 | $S_{\gamma\gamma}$ | XEEX |
| 14 | 30.52-30.14 | $S_{\gamma\delta}$ | XEEE |
| 15 | 29.87 | $S_{\delta\delta}$ | EEE |
| 16 | 28.76 | $T_{\beta\beta}$ | XPX |

TABLE A-continued

| I | Chemical Shift (ppm) | Carbon | Sequence |
|---|---|---|---|
| 17 | 28.28-27.54 | $2B_2$ | XBX |
| 18 | 27.54-26.81 | $S_{\beta\delta}$ + $2B_2$ | BE, PE, BBE |
| 19 | 26.67 | $2B_2$ | EBE |
| 20 | 24.64-24.14 | $S_{\beta\beta}$ | XEX |
| 21 | 21.80-19.50 | $CH_3$ | P |
| 22 | 11.01-10.79 | $CH_3$ | B |

X-Ray Crystallinity

The X-ray crystallinity was measured with an X-ray Diffraction Powder Diffractometer using the Cu-Kα1 radiation with fixed slits and collecting spectra between diffraction angle 2Θ=5° and 2Θ=35° with step of 0.1° every 6 seconds. XRD measurements were performed directly on annealed samples into DSC aluminum pan. The specimens were conditioned in DSC heating up the samples at 10° C./min from room temperature to 180° C., leaving at 180° C. for 5 minutes and then cooling down to 20° C. at 10° C./min. Before being submitted to XRD investigations the samples were left into DSC pan at room temperature and atmospheric pressure for 10 days.

The obtained diffraction pattern was used to derive all the components necessary for the calculation of the degree of crystallinity expressed as % Cr=100×Ca/Ta where Ta is the area, expressed in counts/sec·2Θ, between the spectrum profile and the baseline and Ca, expressed in counts/sec·2Θ, is the area between the spectrum profile and the amorphous profile.

Synthesis of Metallocene Compounds

Dimethylsilanediyl{(1-(2,4,7-trimethylindenyl)-7-(2,5-dimethyl-cyclopenta[1,2-b:4,3-b']-dithiophene)}Zirconium dichloride (A1) was prepared according to WO 01/47939.

Synthesis of Dimethylsilanediyl{(1-(2,4,7-trimethyl-indenyl)-7-(2,5-dimethyl-cyclopenta[1,2-b:4,3-b']-dithiophene)}Zirconium dimethyl (A2)

30.40 g of [1-(2,4,7-trimethylindenyl)][7-(2,5-dimethyl-cyclopenta[1,2-b:4,3-b']-dithiophene)]dimethylsilane and 170 mL of anhydrous THF were charged under nitrogen in a cylindrical glass reactor equipped with magnetic stifling bar. The brown solution so obtained was cooled and maintained at 0° C., while 58.4 mL of a 2.5 M n-BuLi solution in hexane (146 mmol) were added dropwise via dropping funnel. At the end of the addition, the dark brown solution was stirred for 1 hour at room temperature. Then it was cooled to −50° C. and 48.6 mL of MeLi 3.05 M in diethoxymethane (148.2 mmol) were slowly added. In a 250 mL Schlenk flask, 16.84 g of ZrCl4 (MW=233.03 g/mol, 72.26 mmol) were slurried in 170 mL of toluene. Both mixtures were kept at 50° C. and the ZrCl4 slurry was quickly added to the ligand dianion solution. At the end of the addition, the reaction mixture was allowed to reach room temperature and stirred for an additional hour. A yellow-green suspension was obtained. $^1H$ NMR analysis (file rid 20949-282) showed complete conversion to the target complex. All volatiles were removed under reduced pressure, and the obtained free flowing brown powder was suspended in 100 mL of Et2O. After stirring for a few minutes, the suspension was filtered over a G4 frit. The solid on the frit was then washed twice with Et2O (until the washing solvent turned from brown to yellow), then dried under vacuum, and finally extracted on the frit with warm toluene (60° C.), until the filtering solution turned from yellow to colorless (about 650 mL of toluene were used). The extract was dried under reduced pressure to give 28.6 g of yellow powder, which proved to be the pure complex by 1H-NMR (file rid 20949-284). The yield based on the ligand was 73.3%.

1H-NMR: (CD2Cl2, r.t.), ppm: −2.09 (s, Zr—CH3, 3H); −0.79 (s, Zr—CH3, 3H); 1.01 (s, Si—CH3, 3H); 1.04 (s, Si—CH3, 3H); 2.38 (s, CH3 in 4 or 7, 3H); 2.39 (s, CH3 in 2, 3H); 2.43 (d, 3H, methyl group in S2, J=1.37 Hz); 2.52 (s, CH3 in 7 or 4, 3H); 2.57 (d, 3H, methyl group in S2, J=1.37 Hz); 6.61 (dq, H5 or H6, 1H, J=7.04 Hz, J=0.78 Hz); 6.81 (q, CH in S2, 1H, J=1.37 Hz); 6.85 (dq, H6 o H5, 1H, J=7.04 Hz, J=0.78 Hz); 6.87 (q, CH in 82, 1H, J=1.37 Hz); 6.91 (s, H3, 1H).

Preparation of the Catalytic Solutions methylalumoxane (MAO) was supplied by Albemarle as a 30% wt./wt. toluene solution (d=0.92 g/mL) and used as such. Standard triisobutyl aluminium alkyl (TIBA) was supplied by Crompton as pure chemical and further diluted in anhydrous isododecane or cyclohexane, yielding colourless solutions with a concentration of ca. 100 g/L. All chemicals were handled using standard Schlenk techniques.

Catalyst C1A2

(MAO/TIBA, $Al_{TOT}/Zr$=400 Mol/Mol, $Al_{MAO}/Zr$=267 Mol/Mol in Toluene/Cyclohexane)

19.0 mg of A2 were charged at room temperature under nitrogen atmosphere into a 25 mL Schlenk flask, equipped with a magnetic stirrer. At the same time 2.0 mL of MAO Albemarle 30% wt. in toluene ($Al_{MAO}/Zr$=267) were charged at room temperature under nitrogen atmosphere into a second 25 mL Schlenk flask. Triisobutyl aluminium in cyclohexane (8.2 mL, conc. 113 g/L, 4.69 mmol, $Al_{TIBA}/Zr$=133, $Al_{TOT}/Zr$=400 mol/mol, MAO/TIBA=2/1 mol/mol) was then added at room temperature to MAO, obtaining a colourless solution, which was stirred at r.t. for 1 h. Finally this solution of alkyls in cyclohexane/toluene was slowly added at room temperature under nitrogen atmosphere to the metallocene, obtaining a clear dark-red catalytic solution. The latter was further diluted with 4.7 mL of anhydrous cyclohexane and then stirred for 15 min at room temperature and used as such in polymerizations. The solution concentration was of 100 g of total catalyst (metallocene plus MAO plus TIBA) for each litre of solution, while the concentration of A2 resulted to be 1.275 mg of metallocene for each mL of solution.

Catalyst C2A1

(MAO/TIBA, $Al_{TOT}/Zr$=400 Mol/Mol, $Al_{MAO}/Zr$=267 Mol/Mol in Toluene/Isododecane)

62.7 mg of A1 were charged at room temperature under nitrogen atmosphere into a 100 mL Schlenk flask, equipped with a magnetic stirrer. At the same time 6.05 mL of MAO Albemarle 30% wt. in toluene (28.8 mmol, $Al_{MAO}/Zr$=267) were charged at room temperature under nitrogen atmosphere into a 50 mL Schlenk flask. Triisobutyl aluminium (TIBA) in cycloexane (25 mL, conc. 114 g/L, 14.4 mmol, $Al_{TIBA}/Zr$=133, $Al_{TOT}/Zr$=400 mol/mol, MAO/TIBA 2/1 mol/mol) was then added at room temperature to MAO, obtaining a colourless solution, which was stirred at r.t. for 1 hour. Finally this solution of alkyls in isododecane/toluene was slowly added at room temperature under nitrogen atmosphere to the metallocene, previously suspended into 14 mL of anhydrous cycloexane. The resulting clear dark-red catalytic solution was stirred for 1-2 hours at room temperature and used as such in polymerizations. The solution concentration was of 100 g of total catalyst (metallocene plus MAO plus TIBA) for each liter of solution, while the concentration of $Z_S39Me_2$ resulted to be 1.39 mg of metallocene for each mL of solution.

Example 1

The polymerization was carried out in a pilot plant comprising two stirred reactors connected in series in which liquid butene-1, propylene and ethylene constituted the liquid medium. The catalyst system C2-A1 was injected into the first 30 liter reactor at a feed rate of 3 g/h and the polymerization was carried out in continuous at a polymerization temperature of 70° C., while hydrogen, 1-butene, propylene and ethylene were fed according to the data reported on table 1. The pressure of the two reactors was kept constant at 24 bar-g. The 1-butene polymer was recovered as melt from the solution and cut in pellets. The polymerization conditions are reported in table 1.

Comparative Example 1C

The run of example 1 was repeated without a propylene feed. The polymerization conditions are reported in table 1

TABLE 1

| | example | | | |
|---|---|---|---|---|
| | 1 | | 1C | |
| | Firs react. | Sec react | Firs react. | Sec react |
| Residence time (min) | 100 | 80 | 100 | 80 |
| C4-feed (kg/h) | 120 | 30 | 120 | 30 |
| C3-feed (kg/h) | 4 | — | — | — |
| C2-feed (kg/h) | 2.5 | — | 3.6 | — |
| H2 feed (g/h) | 0.4 | — | 0.5 | — |
| H2 bulk conc (ppm) | 120 | 90 | 140 | 100 |
| C2C4 reactivity ration | ~7-8 | ~7-8 | ~7-8 | ~7-8 |
| Solution density kg/m$^3$ | 575-585 | 575-585 | 575-535 | 575-585 |
| Polymer concentration wt % | 20-25 | 20-25 | 20-25 | 20-25 |
| Split between the two reactors | 90-100 | 10-0 | 90-100 | 10-0 |
| Yield (kg polymer/g cat feed) | 10000-12000 | | 10000-12000 | |

C4 = 1-butene; C3 = propylene; C2 = ethylene

Comparative Examples 1*-4*

Polymerization in Autoclave

General Procedure a Copolymerization in Bulk

Comparative Examples 2*, 4*

A 4.4 L jacketed stainless-steel autoclave, equipped with a magnetically driven stirrer and a 35-mL stainless-steel vial, connected to a thermostat for temperature control, was previously purified by washing with an $Al^iBu_3$ solution in isohexanes and dried at 60° C. in a stream of nitrogen.

The amount of monomers and solvent initially charged is reported on table 2

The scavenger (6 mmol of $Al^iBu_3$ as solution in isohexane) and the monomers were charged at room temperature into the autoclave. The latter is then thermostated at the polymerization temperature (70° C.). When pressure and temperature of the autoclave were constant, the solution containing the catalyst/cocatalyst mixture was charged in the stainless-steel vial and injected into the autoclave by nitrogen overpressure. Ethylene was continuously fed over the polymerization time (1 h) with a Flow Record & Control system (FRC) to maintain the pressure at the desired value (11÷15 bar-g). At the end of polymerizations time, stirring was interrupted; the pressure into the autoclave was increased with nitrogen up to 20 bar-g. The bottom discharge valve was opened and the copolymer was discharged into a heated steel tank and treated for 10 min with water steam. The tank heating was switched off and a flow of nitrogen at 0.5 bar-g was fed to remove the water. After cooling at room temperature, the steel tank was opened and the wet polymer collected. The wet polymer was dried overnight in an oven under reduced pressure at 70° C. The polymerization conditions are reported in table 2, the features of the polymers obtained are reported in table 3

General Procedure B Copolymerization in Cyclohexane

Comparative Examples 1*, 3*

A 4.4 L jacketed stainless-steel autoclave, equipped with a magnetically driven stirrer and a 35-mL stainless-steel vial, connected to a thermostat for temperature control, was previously purified by washing with an $Al^iBu_3$ solution in isohexanes and dried at 60° C. in a stream of nitrogen.

The amount of monomers and solvent initially charged is reported on table 2.

The scavenger (6 mmol of $Al^iBu_3$ as solution in isohexane), cyclohexane and monomers were charged at room temperature into the autoclave. The latter is then thermostated at the polymerization temperature (70° C.). When pressure and temperature of the autoclave were constant, the solution containing the catalyst/cocatalyst mixture was charged in the stainless-steel vial and injected into the autoclave by nitrogen overpressure. A constant butene/ethylene mixture (ratio depending on desired copolymer composition) was continuously fed over the polymerization time (1 h) with Flow Record & Control system (FRC) to maintain the pressure at the desired value (8÷13 bar-g). At the end of polymerizations time, stirring was interrupted; the pressure into the autoclave was increased with nitrogen up to 20 bar-g. The bottom discharge valve was opened and the copolymer was discharged into a heated steel tank and treated for 10 min with water steam. The tank heating was switched off and a flow of nitrogen at 0.5 bar-g was fed to remove the water. After cooling at room temperature, the steel tank was opened and the wet polymer collected. The wet polymer was dried overnight in an oven under reduced pressure at 70° C. The polymerization conditions are reported in table 2, the features of the polymers obtained are reported in table 3,

TABLE 2

| Ex | Cat | MC (mg) | C4 Charged (g) | C2 Charged (g) | C4 fed (g) | C2 fed (g) | C2 % wt NMR |
|---|---|---|---|---|---|---|---|
| 1* | C1A2 | 1.27 | 878 | 4.4 | 108.6 | 2.3 | 2.5 |
| 2* | C2A1 | 1.3 | 1344 | 12 | — | 16.9 | 5 |
| 3* | C1A2 | 1.27 | 871 | 11.4 | 170.8 | 9.5 | 6 |
| 4* | C2A1 | 1 | 1331 | 22 | — | 13.8 | 8.5 |
| 5* | C1A2 | 0.89 | 864 | 18.8 | 211.9 | 18.8 | 10.2 |

C4 = 1-butene; C2 = ethylene;
*comparative-polymerization carried out in autoclave;

The obtained polymers have been analyzed; the results are reported in table 3

TABLE 3

| | Test Method | unit | 1 | 1C | 1* | 2* | 3* | 4* |
|---|---|---|---|---|---|---|---|---|
| C2 content by NMR | | % wt | 5.5 | 8.5 | 2.5 | 5 | 6 | 8.5 |
| C3 content by NMR | | | 5.7 | — | — | — | — | — |
| I.V. | | dl/g | 1.7 | 1.8 | 1.5 | 1.8 | 1.8 | 2.6 |

TABLE 3-continued

| | Test Method | unit | 1 | 1C | 1* | 2* | 3* | 4* |
|---|---|---|---|---|---|---|---|---|
| Mechanical Properties[1] | | | | | | | | |
| Hardness Shore A | ISO 868 | — | 81 | 54.4 | >90 | 89.7 | 77.7 | 56.6 |
| Tensile Strength at Break[2] | ISO 527 | MPa | 10.3 | 6 | 34.7 | 22.6 | 17.6 | 6.8 |
| Elongation at Break[2] | ISO 527 | % | 620 | 700 | 500 | 550 | 600 | 700 |
| Tension Set at 100% deformation | ISO 2285 | % | 15 | 14 | 100 | 84 | 42 | 18 |
| Melting point ($T_mII$) | | ° C. | Nd | Nd | Na | Nd | Nd | Nd |
| Melting enthalpy ($\Delta H_fII$) | | J/g | Nd | Nd | Na | Nd | Nd | Nd |
| Melting enthalpy after 10 days ($\Delta H_f$) | | J/g | 17 | 6.7 | Na | Na | Na | 7.0 |
| X-ray crystallinity | | % | 17 | 9 | | | | |

[1]Measured in compression molded samples, aged two weeks prior to testing
[2]5A specimen type, strain rate of 500 mm/min
Nd = not detectable
Na = not available
*comparative polymerization in autoclave

The invention claimed is:

1. A 1-butene/ethylene/propylene terpolymer containing:
   a) from 3 to 10 wt % of ethylene derived units, and
   b) from 2 to 10 wt % of propylene derived units;
   the terpolymer having the following properties:
   a molecular weight distribution Mw/Mn, measured by GPC, lower than 3;
   no melting point detectable by DSC; and
   a melting enthalpy, measured after 10 days of aging at room temperature, of from 12 to 20 J/g.

2. The 1-butene/ethylene/propylene terpolymer according to claim 1 having a Shore A hardness measured according to ISO 868 lower than 90.

3. The 1-butene/ethylene/propylene terpolymer according to claim 1 having a tension set lower than 30% at 100% of deformation measured according to ISO 2285.

4. The 1-butene/ethylene/propylene terpolymer according to claim 1 wherein the melting enthalpy is from 14 to 18 J/g.

5. The 1-butene/ethylene/propylene terpolymer according to claim 1 having a tensile stress at break, measured according to ISO 527, of from 3 MPa to 20 MPa.

6. The 1-butene/ethylene/propylene terpolymer according to claim 1 having an intrinsic viscosity (IV), measured in tetrahydronaphtalene, higher than 1.

* * * * *